Feb. 4, 1969
L. J. KAMM
3,425,132
MEASURING AND SENSING DEVICE
Filed Aug. 29, 1966
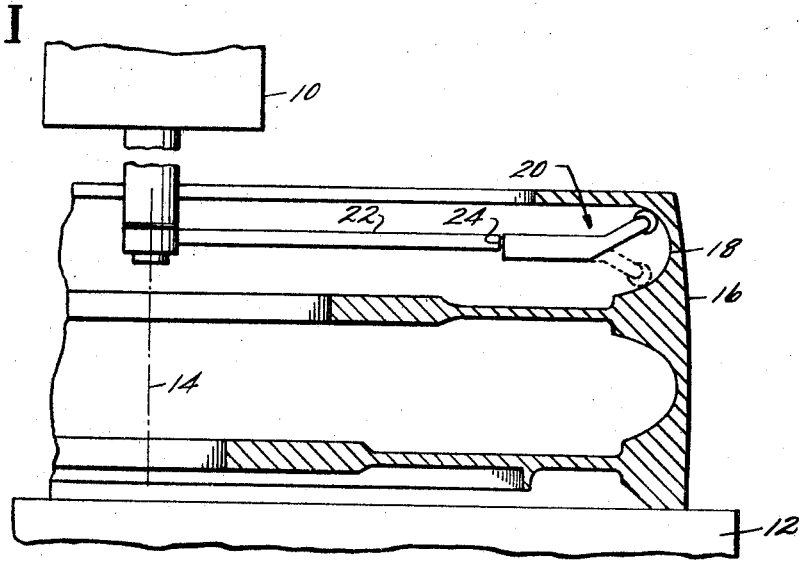
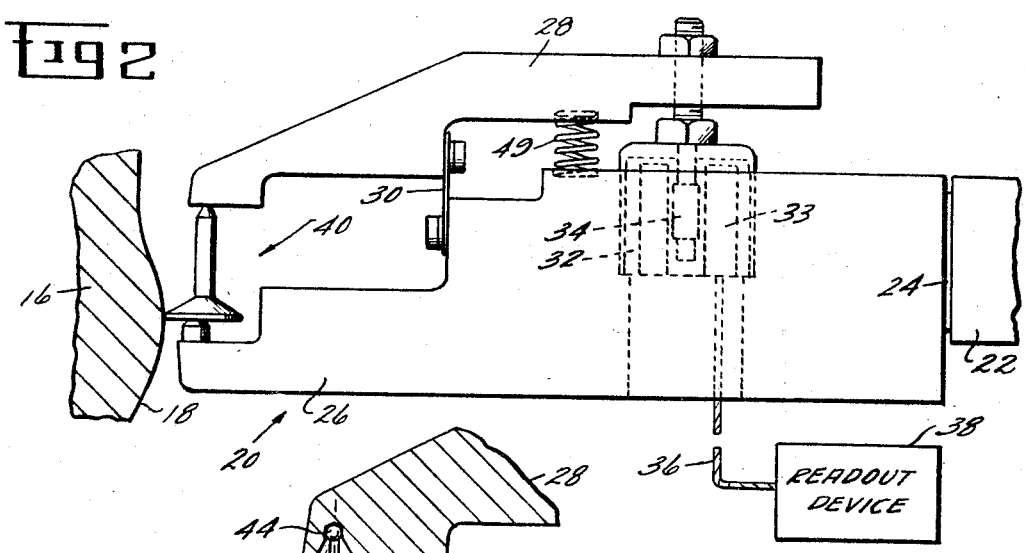
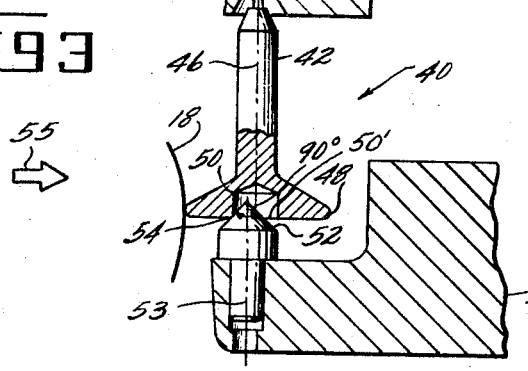
INVENTOR:
LAWRENCE J. KAMM
ATTORNEY United States Patent Office 3,425,132
Patented Feb. 4, 1969

3,425,132
MEASURING AND SENSING DEVICE
Lawrence Joseph Kamm, San Diego, Calif., assignor to General Electric Company, a corporation of New York
Filed Aug. 29, 1966, Ser. No. 575,578
U.S. Cl. 33—172                  6 Claims
Int. Cl. G01b 3/22, 5/20

ABSTRACT OF THE DISCLOSURE

A sensing device is used to check machined inaccesible contours by replacing the cutting tool with said device. The device comprises a spindle with a peripheral ring work contact, and a conical cam which converts displacement of said ring and spindle, said displacement being detected by a linear variable differential transformer and indicated by a readout component.

---

In manufacturing operations, it is common to produce intricate shapes by tape-controlled machines. Examples are vertical and horizontal turret lathes. In such machines a part is turned and the cutting tool guided by means of a magnetic tape that may have been generated by a computer. This results in extreme accuracy and continuous operation and permits one operator to handle many machines. Very intricate shapes may be thus machined by tapes and require accurate checking.

By way of example, although not limiting, gas turbine compressor rotors may be cut by tape-controlled machines. These consist of generally cylindrical hollow rotors with both outer and inner grooves forming a complex contour on the barrel-like rotor. The complex inner contour of the rotor is difficult to measure to insure that the machining is correct. One means of inspection has been to use mechanical guages that are collapsible so that they fold and can be inserted within the rotor where they are then expanded to contact the specific points requiring measurement. Such measuring is complex, time consuming, and not completely accurate. Another means of measuring an inner contour has been to cast a mold in the actual contour sections. In other words, a casting powder is poured into a small section of the inner contour, allowed to harden, and then removed and the casting is measured. Both methods of measuring require removal of the part from the machine whereupon the measurement is made, and if errors are detected, the part is returned to the machine for corrective machining. Obviously, such methods of measuring are time-consuming, complex and expensive.

The main object of the present invention is to provide a measuring and sensing device that can accurately measure inside hidden contours accurately.

Another object is to provide such a device which will measure the contours and the dimensions of the particular part while it is still on the machine so that corrections may be made as required.

A further object is to provide such a device which employs a unique mechanical linkage to transmit motion of the contour surface being sensed to a detecting means that may be connected to a readout device to give a visual indication of the contour sensed.

Another object is to provide such a device which, by using selected ratios and angles provides a one-to-one ratio for a direct reading to minimize any calibration errors.

A further object is to provide such a device which uses a spindle and a preferably circular cone arrangement in combination with a ring on the spindle so that motion at right angles to the periphery of the ring at any point in the plane thereof results in linear displacement of the detecting means to provide a visual indication and/or dimensions of the contour being measured.

Briefly stated, the invention provides a measuring and sensing device made up of an elongated base member with a rocker arm pivoted thereon. Means, such as a linear variable differential transformer, is provided to detect relative rocking movement between the arm and the base and a suitable readout component is connected to the detecting means to provide an indication of the movement of the arm. A sensing spindle is universally suspended, preferably at one end in a pendulum-like fashion from the arm, and the spindle carries a ring in a plane normal to the spindle's longitudinal centerline. The ring is adapted to contact, at right angles along its periphery, the surface or contour that is to be sensed. The spindle is provided with a preferably cylindrical opening at the other end within the ring. A circular cone is supported on the base and projects into the opening in a loose contacting fit. Biasing means is provided for pivoting the arm to a position in which the edge of the cylindrical opening contacts the cone at a given point, preferably at at a mid-point on the slope of the cone, when the ring is simultaneously in contact with the surface to be measured. Movement of the ring by a force generated by contact between the surface to be measured and the ring in the plane of the ring will cause the edge of the opening to ride up or down the cone. This movement is transmitted by the spindle through the rocker arm to the detecting means. Thus, movement of the ring is converted into corresponding movement of the detecting means at the other end of the arm, the movement of the detecting means being indicated by the readout component. By proper set-up of the contact point between the cone and the opening, the measuring and sensing device of this invention will sense and detect accurately movement of the ring in any direction caused by forces acting in the plane of the ring. By a further aspect of the invention, proper selection of the cone slope and locations of the spindle and detecting means will provide one-to-one movement ratios between the ring and the detecting means.

While the specification concludes with claims particularly pointing out and distinctly claiming the subject matter which is regarded as the invention, it is believed the invention will be better understood from the following description taken in connection with the accompanying drawing in which:

FIGURE 1 is a partial schematic showing the device as used on an internal difficult-to-reach contour;

FIGURE 2 is a general schematic elevational view of the invention; and

FIGURE 3 is an enlarged view, partially in section, of the novel sensing structure for following a complex contour.

In tape-controlled machines it is possible to produce complex and intricate parts by cutters that are directed by tape that has been generated by a computer. Such machining is well known. It is necessary also to check the parts, preferably without removal of the part from the machine, so that if errors occur, corrections can be made. A typical example is a rotor, as used in gas turbine or jet engine powerplants. Such rotors have a hollow barrel-like shape with complex internal contours that must be cut and then measured without removal from the machine to avoid costly shut-downs and lost time. Since the cutter is tape-controlled, it is desirable to provide a device that may replace the cutter or operate with it and retract its path under the control of the tape and produce a visual indication to verify the accuracy of the contour machined. A typical application is schematically shown in FIG. 1.

In this figure, there is shown a vertical turret lathe with its turret 10 and chuck 12 operating about centerline 14. With suitable cutting tools that are tape-controlled, a rotor 16 with a complex internal contour 18 may be formed. In order to check the shape and dimensions of contour 18, it is desired to provide a device which may be preferably substituted for the cutting tool and is guided by the same tape to retrace the cutter path and verify the accuracy of the machining operation.

A measuring and sensing device of the instant invention, as generally shown at 20 in FIG. 1, is provided for this purpose. It may be substituted for the cutting tool at the end of suitable tool holder 22. Thus, the measuring and sensing device 20 retraces the path of the cutting tool and is intended to give a visual indication on a readout component of any variation from the desired contour.

The device generally indicated at 20 in FIG. 1 is designed to fasten to tool holder 22 and be rotatable thereon at coupling 24 for versatility in reaching all parts of the internal surfaces of the contour 18. The coupling may be any suitable structure to allow the sensing device to be flipped from one side (solid) to the other (dotted) any desired amount.

Referring next to FIG. 2, the sensing device 20 is shown enlarged in more detail. It can be seen that it comprises an elongated base member 26 with a rocker arm 28 pivoted to and carried by the base member through flexture strap pivot 30 that is provided, preferably at the mid-point of rocker arm 28, for reasons that will become apparent. Any suitable pivoting structure may be provided, the flexure strap being preferred. Since the arm 28 will rock about the pivot 30 as a result of change in contour at 18 as will become apparent, a suitable detecting means 32 is provided to detect the relative rocking movement between the arm and the base. The detecting means 32 may take any suitable form that detects motion in a linear direction and may be pneumatic, mechanical or electrical. Generally, an electrical linear variable differential transformer (LVDT) is preferred and is well-known. This comprises an outer coil structure 33 and central core 34. The detecting means may be connected with the core and secured to the rocker arm and the transformer carried by the base as shown or vice versa. The LVDT generates a voltage proportional to the displacement between the core 34 and the coil 33 and by suitable connections 36 is connected to a readout component 38 that may be a voltmeter or a suitable recording device to provide a tracing or any suitable visual indication of the relative movement between the parts. It may also be connected as part of a feedback closed loop circuit to initiate corrections by other known means.

In order to detect minute variations of contour 18 accurately, a displacement transducer which is able to accept displacement about 360 degrees in a plane is provided at one end of rocker arm 28 as generally indicated at 40. This may be called an omniducer since it is sensitive to displacement in any direction in a plane. The details of omniducer 40 are shown in an operating position in FIG. 3. These comprise a sensing spindle 42 that is suspended at one end at joint 44 pendulum-like from rocker arm 28. The universal suspnsion may conveniently be a balljoint at 44 to allow free movement of spindle 42 in any direction. The spindle is generally valve-shaped, as shown, with longitudinal centerline 46. In order to sense the changes in contour 18, a ring 48 is carried at the other end of the spindle in a plane normal to the longitudinal centerline 46 of the spindle. This ring is designed to contact, at right angles along its periphery, the surface or contour 18 to be sensed. To ensure this contact, a bias means 49 may be provided to load the ring 48. Thus, a change in the contour moves ring 48 to swing spindle 42 about its joint 44 in the rocker arm.

In order to detect displacement in the plane of the ring and convert it into linear displacement at detecting means 32, the spindle is provided with an opening 50 at the opposite end from its suspension at 44 which opening is disposed within the ring as shown. To avoid any calibrations or correction factors being required, the opening 50 is preferably centered on the longitudinal centerline 46 and its edge 50' is disposed in substantially the plane of the ring 48. Also, the preferable shape of the opening is circular. Cooperating with this opening, there is provided a preferably circular cone 52 that is supported on base member 26.

It will be apparent that, practically, the ring 48 cannot be deflected in its plane by a force applied from the direction of the base and rocker arm because of the presence of these components. Thus, the device will accept motion about substantially 360 degrees less the small amount occupied by the base and rocker arm.

Because of the desire to have the readout device provide a positive and negative reading from a center or zero position, the cone 52 is disposed to project into opening 50 in a loose contacting fit at right angles at 54 with the edge 50 of the opening substantially midway of the cone surface as shown in FIG. 3. This position is then taken as the zero reading so that motion of the ring 48 in its plane in a direction defined by the intersection of its plane and the plane defined by the centerlines 46 and 53 of the spindle 42 and the cone 52, respectively, causes the edge 50' of the opening 50 to ride up or down the cone for a positive or negative reading on the readout device 38, the bias spring 49 maintaining contact between the edge 50' and the cone 52.

Thus, the centerlines 46 and 53 are aligned when looking in at the end of the base and rocker arm in the direction of arrow 55 as seen in FIG. 3. In the plane at right angles as seen in FIG. 3, the centerlines 46 and 53 are offset slightly when the spindle hangs vertically in the balanced or static position. The amount of the offset is merely that which is required to allow the spindle to contact the cone at 54 substantially midway of the cone surface. This provides greater accuracy during movement of the ring 48 up and down the cone in FIG. 3.

While the cone may be any suitable shape, it is preferred to make it circular with the longitudinal axis 53 of the cone through the center of its base so that its apex forms or encloses 90 degrees, as shown. This is termed a 90° cone. The purpose of this is to provide a one-to-one ratio of movement as will be later explained.

By this novel linkage, it will be apparent that movement applied to the spindle through the ring in the plane of the ring substantially parallel to the cone base is converted into a vertical displacement by cooperation between the edge 50' of the opening 50 and cone 52. This, in turn, is detected by the other structure (e.g. LVDT) described. It will be clear that the motion applied to the spindle must come from the side or at right angles to the spindle axis 46 in order for the spindle to ride up the cone so that the ring 48 is placed into contact with contour 18 about the periphery of the ring at right angles to the surface to be measured. By maintaining the 90 degree cone and the circular opening 50 in conjunction with a midpoint pivot 30 in rocker arm 28, it will be apparent that a one-to-one ratio is maintained throughout the device thus simplifying any calibration and providing direct readout. In other words, a one thousandth movement of ring 48 in the plane of the ring, is translated into a one thousandth linear movement of core 34 and an equivalent readout. Other angles and moment arms would require calibrating and allowance for a ratio correction.

It will readily occur to those skilled in the art that the transducer or omniducer 40 is capable of sensing accurately movement of the ring 48 in any direction within its plane once the axes 46 and 53 of the spindle 42 and the cone 52 are aligned such that the desired direction lies in the plane defined by the axes. This alignment is required, of course, so that a given movement of the ring 48 will be transmitted into precisely equal movement of the spindle 42 and the core 34 of the detecting device 32. The force applied to the ring 48 must also be disposed in the plane of the ring so that the arm 28 will not be moved inaccurately by forces not transmitted through the edge 50' and the cone 52.

In order to provide versatility to the device, coupling means 24 is provided in the base member between the tool holder 22 and the sensing device 20. This permits the entire transducer structure 40 to be put on an offset arm and to be rotated from the solid line position shown in FIG. 1 to the dotted line position permitting a wider range of measuring capabilities of the device.

It will be apparent that the novel linkage structure, as shown in detail in FIG. 3 in combination with the rest of the structure described, provides a measuring and sensing device which is capable of accepting movement by complex contours in any direction in the plane of ring 48 and accurately producing a visual readout. This is done without the removal of the part from the machine and thus any changes can be immediately made by removing the sensing device from the machine and replacing it with the cutting tool for the appropriate correction.

While there has been described a preferred form of the invention, obviously modifications and variations are possible in light of the above teachings.

I claim:
1. A measuring and sensing device comprising:
a spindle having an axis and including a coaxial circular ring portion projecting therefrom in a plane normal to said axis and a coaxial cylindrical opening in one end thereof,
base means,
a right circular cone secured to said base means and projecting therefrom into said cylindrical opening,
indicating means,
means connecting said spindle and said indicating means such that movement of said spindle along its axis is indicated proportionally by said indicating means.
and biasing means urging said spindle axially toward said conical member such that the edge of said opening contacts the surface of said cone,
whereby displacement of said ring portion by a force exerted thereon within the plane of said ring portion will result in related axial movement of said spindle and a measurement of said axial movement by said indicating means.

2. A measuring and sensing device as defined by claim 1 in which said ring portion is axially aligned with the edge of said cylindrical opening such that displacement of said ring portion results in equal displacement of the edge of said cylindrical opening, and in which the connecting means between said spindle and said indicating means is a universal connection and is at the end of said spindle opposite said cylindrical opening.

3. A measuring and sensing device as defined by claim 2 in which the apex of said right circular cone encloses an angle of 90 degrees and the axes of said cone and said spindle are not coincidental, whereby displacement of said ring portion by a force exerted thereon along a direction defined by the intersection of the plane of the ring portion and the plane formed by the axes of said spindle and said right circular cone will result in equal axial displacement of said spindle such that said indicating means directly measures not only axial movement of said spindle but also transverse movement of said ring portion.

4. A measuring and sensing device as defined by claim 3 in which said connecting means includes a member connected to said spindle and said indicating means at opposite ends thereof, said connecting means further including means pivotally supporting said member relative to said base means, the pivot point being spaced midway between the connections to said spindle and said indicating means such that said connecting means converts axial movement of said spindle into equal axial movement of said indicating means.

5. A measuring and sensing device as defined by claim 4 in which said indicating means comprises a linear variable differential transformer, whereby displacement of said ring portion of said spindle results in equal displacement in said linear variable differential transformer and an accompanying change in output voltage.

6. A measuring and sensing device as defined by claim 5 in which said indicating means further includes readout means for measuring output voltage of said linear variable differential transformer and thereby indicating the position of said ring portion of said spindle.

References Cited
UNITED STATES PATENTS

| | | | |
|---|---|---|---|
| 3,121,370 | 2/1964 | Larsen | 90—13.5 |
| 2,868,092 | 1/1959 | Foncannon et al. | 90—62 |

LEONARD FORMAN, *Primary Examiner.*

R. A. FIELDS, *Assistant Examiner.*